(12) United States Patent
Mritunjai

(10) Patent No.: US 11,074,244 B1
Mritunjai
(45) Date of Patent: Jul. 27, 2021

(54) TRANSACTIONAL RANGE DELETE IN DISTRIBUTED DATABASES

(71) Applicant: Amazon Technologies, Inc., Seattle, WA (US)

(72) Inventor: Akhilesh Mritunjai, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 185 days.

(21) Appl. No.: 16/131,623

(22) Filed: Sep. 14, 2018

(51) Int. Cl.
*G06F 16/23* (2019.01)
*G06F 16/27* (2019.01)

(52) U.S. Cl.
CPC ........ *G06F 16/2379* (2019.01); *G06F 16/278* (2019.01)

(58) Field of Classification Search
CPC ............ G06F 16/9535; G06F 16/2358; G06F 16/2379
USPC .................................................. 707/802, 704
See application file for complete search history.

(56) References Cited

U.S. PATENT DOCUMENTS

| | | | |
|---|---|---|---|
| 2005/0071383 A1* | 3/2005 | Herbst | G06F 16/2379 |
| 2014/0359771 A1* | 12/2014 | Dash | H04L 63/1408 |
| | | | 726/23 |
| 2017/0220659 A1* | 8/2017 | Holbrook | G06F 16/27 |
| 2017/0270172 A1* | 9/2017 | Tobin | G06F 16/2428 |

* cited by examiner

*Primary Examiner* — Robert W Beausoliel, Jr.
*Assistant Examiner* — Pedro J Santos
(74) *Attorney, Agent, or Firm* — Knobbe, Martens, Olson & Bear, LLP

(57) ABSTRACT

A database service that receives and manages time series data into a set of generational data tables. The database service maintains subsets of the time series data in a plurality of partitions and a set of virtual keys defining the range of time series of data in each partition. Thereafter, responsive to a transactional range delete command, the database service identifies partitions having overlapping time series data and processes the delete command at each respective partition.

23 Claims, 7 Drawing Sheets

TRANSACTIONAL RANGE DELETE IN DISTRIBUTED DATABASES

BACKGROUND

Generally described, computing devices and communication networks can be utilized to exchange data or information. In a common application, a computing device can request content from another computing device via the communication network. For example, a user at a personal computing device can utilize a browser application to request a content page (e.g., a network page, a Web page, etc.) or access a service from a server computing device via the network (e.g., the Internet). In such embodiments, the user computing device can be referred to as a client computing device and the server computing device can be referred to as a content provider or service provider.

In some applications, service provider can generate or receive data as part of the interaction with a plurality of user devices or other network-based devices. The service providers may wish to store and maintain the data and make the stored data accessible at a later date. In such applications, the service provider may utilize a network-based database service that can be utilized to receive data via the communication network. The network-based database service can further provide requested data via the communication network. Additionally, the network-based database service can receive commands related to the management of stored data.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
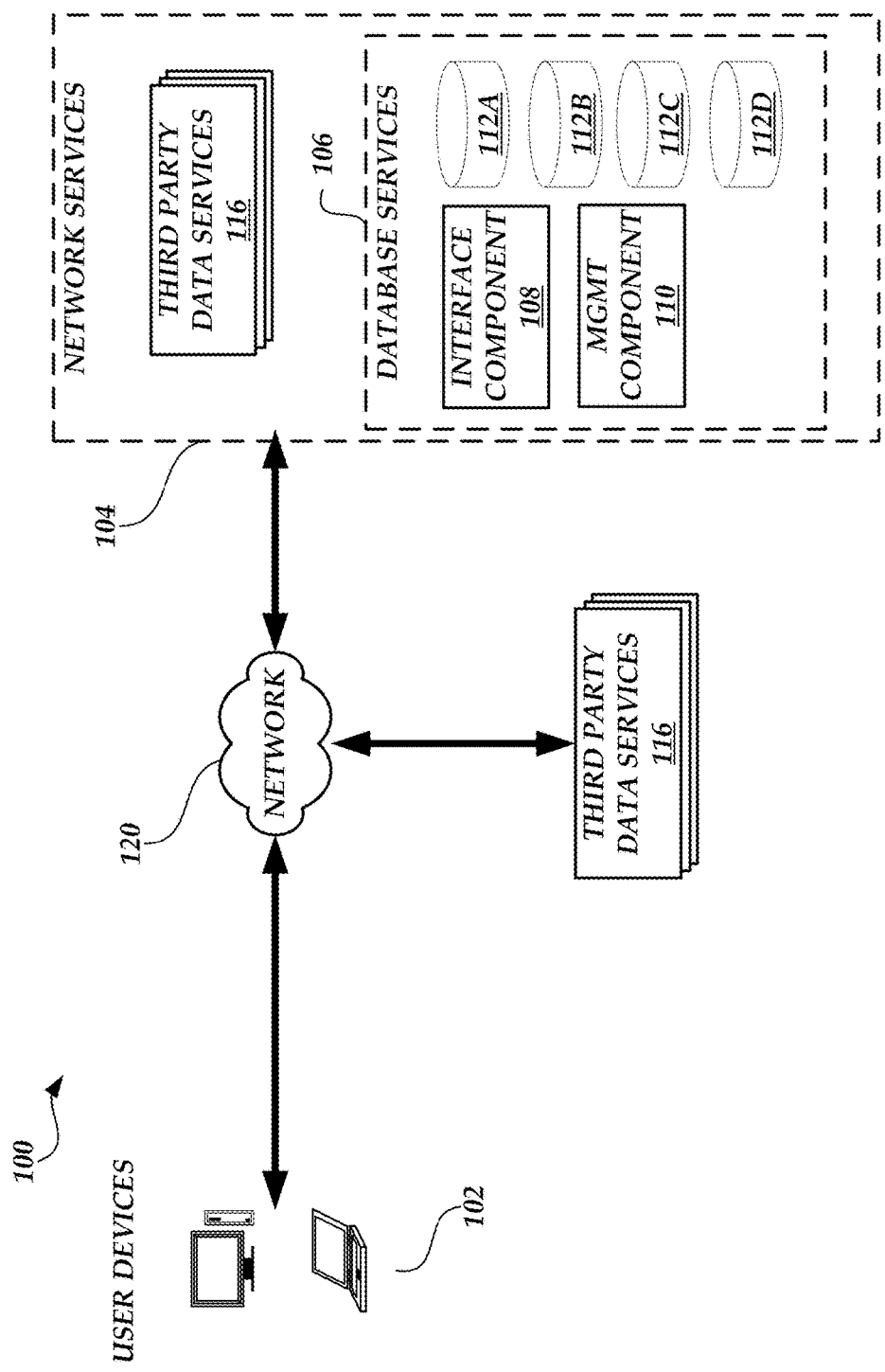
FIG. 1 is a block diagram of a network environment that includes one or more user devices, one or more third-party data services, a network services system, and a database service in accordance with some embodiments.

Generally described, service providers or content providers can provide or host services that collect or generate data for storage, which can generally be referred to as a data service. With regard to service providers that engage in commerce, the service provider can host one or more services or network resources that interact with user computing devices or other service providers for purposes of facilitating transactions. As part of the interaction or transaction, one or more components of the services/network resources can generate data that the service may wish to store, such as using a network-based database service. Depending on the type of service provider, interaction or transaction, the volume of data transmitted to the database service provider can be large.

In some specific embodiments, data services can provide the database service with time series data. Generally described, time series data corresponds to a series of data points or data values that are associated with timing information and ordered according to the timing information. For example, time series data can correspond to a sequential series of measurements of one or more values/attributes at predetermined time intervals. In another example, time series data can correspond to transaction data corresponding to a sequence of one or more values/attributes associated with timing information of when the transaction generating the value/attribute occurs or is collected. Time series data can encompass a variety of data types including numeric data, symbolic data, and the like. Time series data can be recalled by the data services or other third parties to facilitate a variety of data analysis, such as forecasting, regression analysis, and the like.

As applied to managing time series data and other data, a database service provider can receive and store received time series data in a database table or data table. For example, the database table can be organized according to the timing information and one or more values/representations corresponding to the timing information. Typically, the database table provided by the database provider would need to be associated with access parameters that facilitate writing the time series data to the database table as it is received by the database service provider and reading access for recalling/transmitting the stored time series data.

In certain embodiments, the database service provider can store the time series data (or other data) by mapping a partition key corresponding to the entire time series data to a single partition in a single database node. In such embodiments, because the time series data is associated with a single partition on a single node, the database service can receive commands to manage the time series data and execute the received commands on the single partition. For example, in the event, the database service can receive commands relating to deleting a range of time series data (ordered by timing information) and can execute the deletion command by evaluating the time series data stored on the single partition. Mapping a partition key to the time series data to a single partition presents inefficiencies for the database service regarding redundancies of the data, availability of the data if an error occurs in the single partition and performance related to a single node providing the time series data.

To address potential inefficiencies associated with the single partition approach, a database service may implement a distributed database model in which a single partition key corresponding to the data is maintained over multiple partitions. The multiple partitions may be in one or more database nodes. Incorporation of multiple partitions facilitates additional redundancies for the stored data, such as time series data, additional failover or availability for at least a portion of the data and potential performance gains associated with multiple nodes providing the data. The storage of the data among the multiple partitions or the specifics of the allocation of multiple partitions is typically hidden from the data service customer. However, because the data is no longer associated with a key to partition, the traditional distributed database implementing key to multiple partitions cannot support some commands, such as transactional range deletes.

To address at least in part some of the above-described deficiencies associated with traditional database data intake and management techniques, aspects of the present application correspond to a method and system for managing data. More specifically, in one embodiment, a service includes a management component that can process transactional range delete commands and implement the functionality across time series data stored in multiple, distributed partitions. Illustratively, a data service transmits a set of time series data associated with a range of values, such as by timing information, to a database services. After receipt, the database service stores the receiving set of time series data by writing subsets of the time series data a plurality of partitions. The plurality of partitions may be located on one or more database nodes. To manage the set of time series data, the database service associates the entire set of time series data with a common identifier. Additionally, the database service associates each individual partition with a virtual key that maps/captures the portion of the range of time series data (e.g., the subset of time series data) maintained in the individual partition. The virtual key illustratively is defined as a beginning range of the time series data (inclusive) and an ending range of the time series data (exclusive). The set of virtual keys corresponding to all the partitions should illustratively encompass the entire set of time series data and can be maintained in an index.

Generally described, transactional range delete commands specify a range of data to delete, such as a range of time series data. To facilitate the processing of commands, such as a transactional range delete, the database service receives the commands and processes the command to identify the partitions that maintain time series data relevant to the command. More specifically, the database service can utilize the set of virtual keys associated with each of the partitions to identify which partition includes times series data falling within the specified range of time series data included in the transaction range delete command. If the transactional range delete command only corresponds to time series data maintained in a single partition, the database service can simply execute the command (e.g., deleting the specified full range of time series data) on the single partition.

If the transaction range delete command encompasses multiple partitions, the database service specifies for each virtual key the range of time series that should be deleted in each partition. Because the transaction range delete command traverses multiple partitions, it is possible that time series data from some partitions can be deleted and that only portions of time series data from some partitions can be deleted.

Once the relevant partitions have been identified, the database service then prepares the identified set of partitions and if confirmed, the virtual keys are converted to an indicator, generally referred to as range tombstones, which specify that the time series data in each of the partitions can be overwritten or no longer operable for subsequent read commands. Additionally, in some embodiments, the database service can continue to split and merge partitions during the processing of transaction range delete commands and will adjust the virtual key/tombstone processing based on the split/merger. Still further, the database service can begin to overwrite the data after the processing of the delete commands and provide the subsequently written data.

Accordingly, by utilizing aspects of the present application, data services can benefit from the distributed, multi-partitions redundancy and performance optimizations and be able to support specific commands, such as transactional range deletes, that are not traditionally available in distributed, multi-partition storage frameworks.

In accordance with one or more aspects of the present application, the operations of the database service provider will be described with regard to the management of time series data in which timing information forms the range keys for the virtual keys and transactional range delete. However, in other embodiments, the database service can implement at least aspects of the functionality associated with the present application on data that may not be considered time series data. For example, one or more aspects of the present application may be applied to data in which the range keys are formed from different ordered information, such as data incorporating range keys based on user identifiers, device identifiers, or similar information. Accordingly, while the present application will be illustratively described with regard to time series data, such discussion is illustrative in nature and should be construed as limiting or exhaustive of all possible applications of one or more aspects of the present application.

FIG. 1 illustrates a general network environment 100 for the generation, processing and storing of data. Illustratively, network environment 100 will be described with regard to the generation, processing and storage of time series data. The network environment 100 includes a plurality of devices 102 utilized by individual users, generally referred to as user computing devices, configured to interact with one or more aspects of the network environment component or request time series data stored by components of the network environment 100.

User computing devices 102 may include any number of different computing devices capable of communicating with the networks 140, 150, 160, via a direct connection or via an intermediary. For example, individual accessing computing devices may correspond to a laptop or tablet computer, personal computer, wearable computer, server, personal digital assistant ("PDA"), hybrid PDA/mobile phone, mobile phone, electronic book reader, set-top box, camera, appliance (e.g., a thermostat or refrigerator), controller, digital media player, watch, eyewear, a home or car device, Internet of Things ("IoT") devices, virtual reality or augmented reality devices, and the like. Each user computing device 102 may optionally include one or more data stores (not shown in FIG. 1) including various applications or computer-executable instructions, such as web browsers, used to implement the embodiments disclosed herein. Illustrative components of a user computing device 102 will be described with regard to FIG. 2.

Network 120 may be any wired network, wireless network, or combination thereof. In addition, the networks 120 may be a personal area network, local area network, wide area network, cable network, fiber network, satellite network, cellular telephone network, data network or combination thereof. In the example environment of FIG. 1, network 120 is a global area network ("GAN"), such as the Internet. Protocols and components for communicating via the other aforementioned types of communication networks are well known to those skilled in the art of computer communications and thus, need not be described in more detail herein. While the user device 102 is depicted as having a single connection to the network 120, individual components of the user devices 102 may be connected to the network 120 at disparate points. Accordingly, communication times and capabilities may vary between the components of FIG. 1.

The network environment 100 also includes a set of network services, generally referred to as network service 104 or network services 104, that represents a set of network services made available by one or more service providers via a communication network, such as communication network 120. Illustratively, to facilitate the receipt and processing of time series data, the network services 104 can include database services 106. Database services 106 corresponds to a network-based database service hosted by a service provider. For purposes of illustrating aspects of the present application, the database service 106 includes an interface component 108 for receiving time series data (or other data) from data services. Although illustrated as a single component, the interface component 108 logically represents one or more computing devices (physical or virtual) that are configured to receive time series data from data services. For example, the interface component may correspond to any number of physical or virtual computing devices configured in geographically distinct areas. The database services further include a management component 110 that is configured, at least in part, to manage the processing of commands, such as transactional range deletes in a distributed multi-partition configuration. Illustrative components and operation of a management component 110 will be described with regard to FIG. 3.

The database services 106 can include a plurality of data stores 112A, 112B, 112C and 112D or database nodes for maintaining time series data in accordance with one or more aspects of the present application. FIG. 1 illustrates multiple data stores 112 for receiving and maintaining time series data. The data stores are logically represented together but may be implemented in a distributed manner, such as via geographically distinct areas. In some embodiments, one or more individual nodes 112 can have a single partition for hosting subsets of the time series data as described herein. In other embodiment, individual nodes 112 can host multiple partitions. Additionally, although represented as single components, individual data stores or multiple data stores may be implemented utilizing a number of physical computing devices, virtual computing devices, or combination thereof. As will be described in detail below, the data stores will maintain subsets of time series data in partitions. Although referenced as single partitions, the data stores/data nodes may have multiple copies of individual partitions for performance and redundancy purposes.

It will be appreciated by those skilled in the art that the network services 104 may have fewer or greater components than are illustrated in FIG. 1. Thus, the depiction of the network services 104 in FIG. 1 should be taken as illustrative.

The network environment 100 can include a plurality of data services, such third party data services 116, for collecting or generating time series data to be stored in the database service 106. The third party data services 116 may include one or more servers or components that correspond to any one of a variety of functions such as hosting commerce via network 120, providing content via network 120, measuring (directly or indirectly) events and the like. As illustrated in FIG. 1, the third party data services 116 may be hosted as part of the network services 104, such as utilizing virtual machine resources. In some embodiments, the third party data services 116 may be hosted independent of the network services 104, such as in a stand-alone communication network and be connected to the network service(s) via communication network 120. Still further, one or more combinations or various combinations of partially hosted third-party data services 116 may include components associated with the network service 104 and additional independent networks. One skilled in the relevant art will appreciate that reference to third-party data services is intended solely to illustrate the transmission of time series data to network services and that affiliation of a data service to the network services is not required or prohibited.

Figure 2:
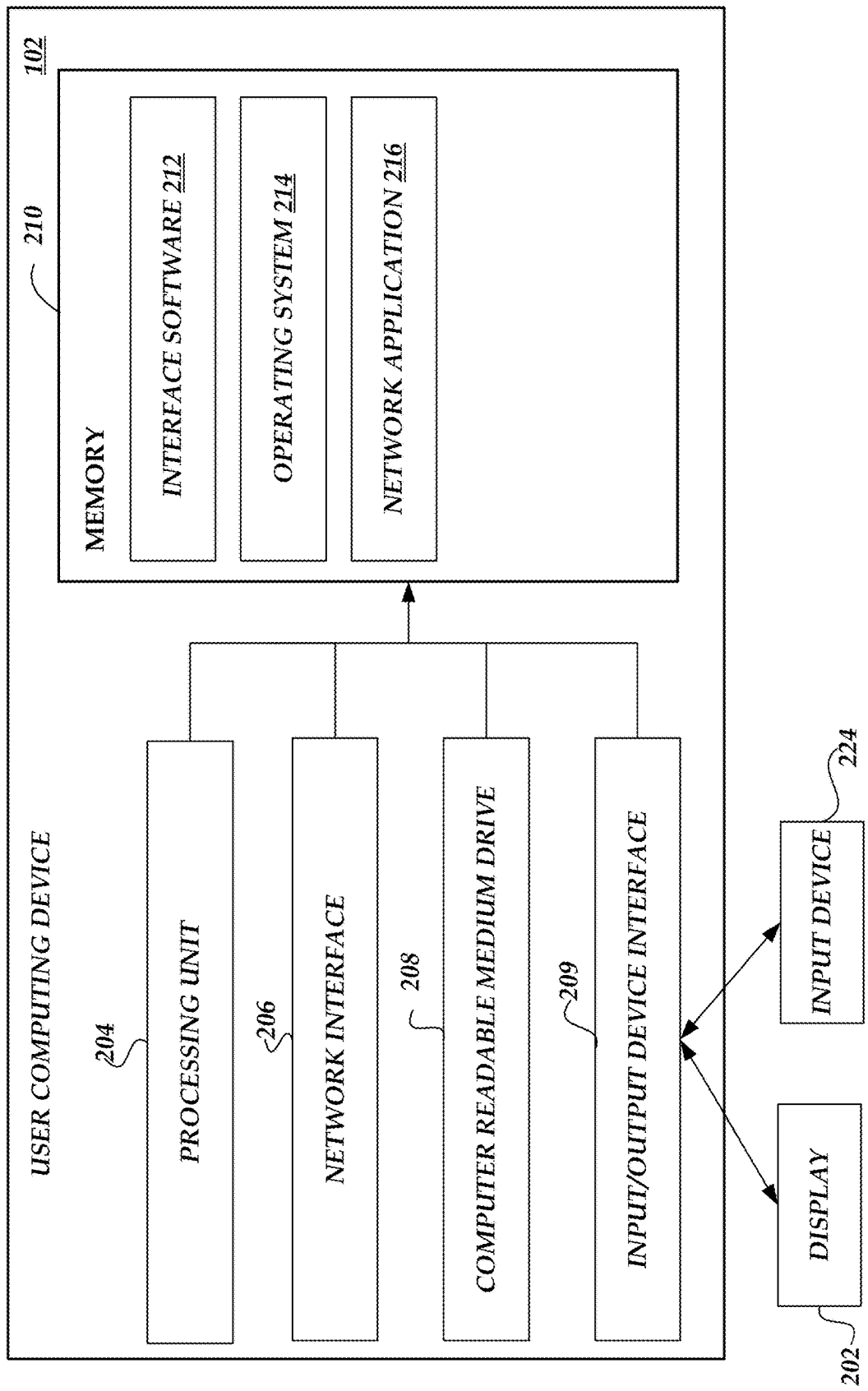
FIG. 2 is a block diagram illustrative of components of user device for interacting with data services or database service in accordance with some embodiments.

FIG. 2 depicts one embodiment of an architecture of an illustrative user computing device 102 that can generate content requests and process metric information in accordance with the present application. The general architecture of the user computing device 102 depicted in FIG. 2 includes an arrangement of computer hardware and software components that may be used to implement aspects of the present disclosure. As illustrated, the user computing device 102 includes a processing unit 204, a network interface 206, an input/output device interface 209, an optional display 202, and an input device 224, all of which may communicate with one another by way of a communication bus.

The network interface 206 may provide connectivity to one or more networks or computing systems, such as the network 120 of FIG. 1, and the network services 104. The processing unit 204 may thus receive information and instructions from other computing systems or services via a network. The processing unit 204 may also communicate to and from memory 210 and further provide output information for an optional display 202 via the input/output device interface 209. The input/output device interface 209 may also accept input from the optional input device 224, such as a keyboard, mouse, digital pen, etc. In some embodiments, the user computing device 102 may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the user computing device 102. The memory 210 may further include computer program instructions and other information for implementing aspects of the present disclosure. For example, in one embodiment, the memory 210 includes interface software 212 for transmitting data from the user device 102. In some embodiments, the memory 210 may include one or more additional software applications or components that are configured, at least in part, to transmit commands related to operations of time series data as described herein. For example, network application 217 may be configured to request or transmit transactional range deletes. The network application 217 may also be used to configure some portion of the storage of time series data, such as configuring different partitions or levels of redundancy.

Figure 3:
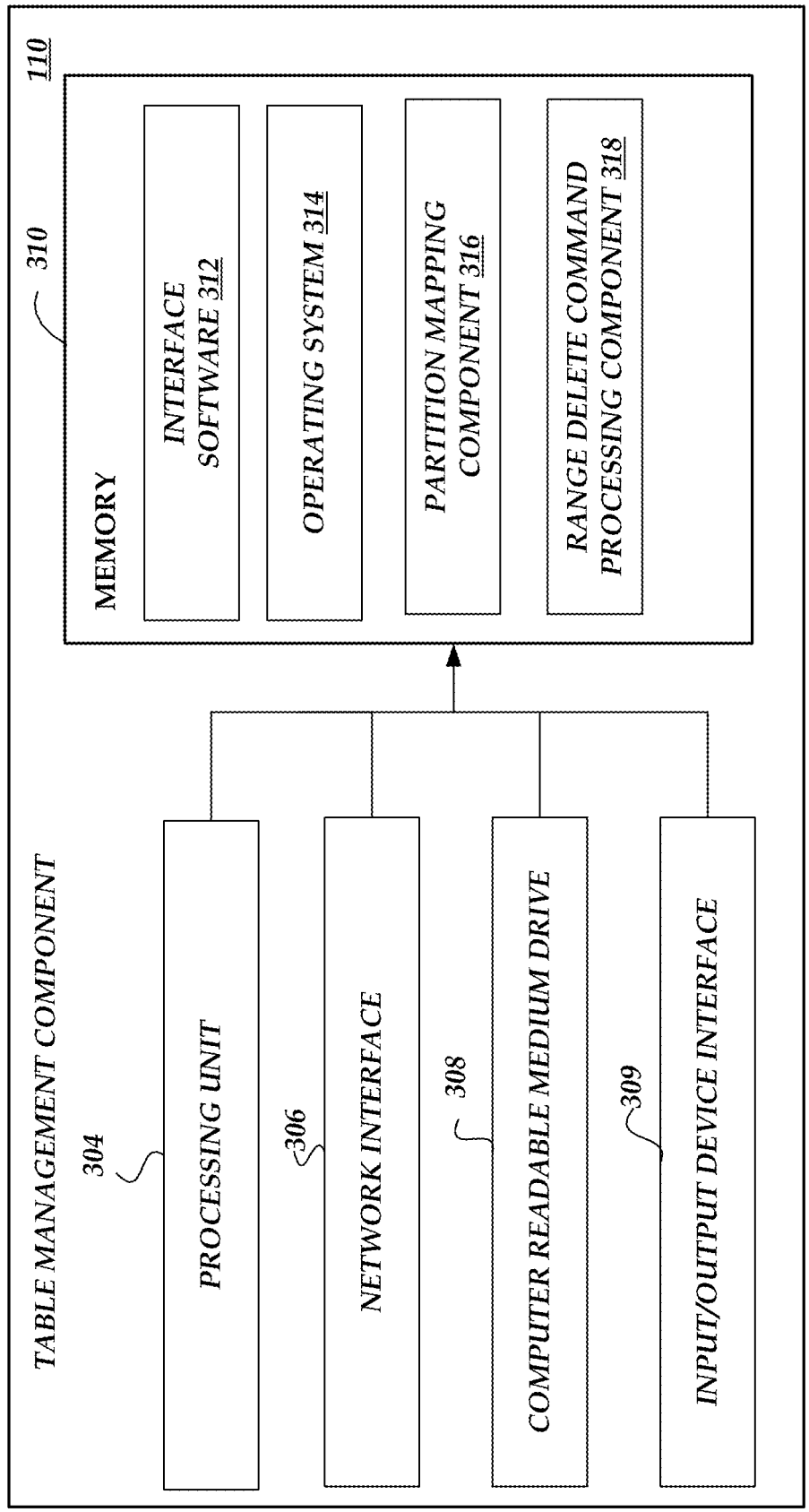
FIG. 3 is a block diagram illustrative of components of a management component of a database service for managing the generation-based data tables utilized to maintain time series data at a database service in accordance with some embodiments.

FIG. 3 depicts one embodiment of an architecture of an illustrative computing device for implementing various aspects of the management of the data tables utilized to store time series data (or other data) in accordance with aspects of the present application. The computing device 300 can be a part of the database services 106, such as a management component 110. Alternatively, the computing device may a stand-alone device independent of the database services 106.

The general architecture of the computing device 300 depicted in FIG. 3 includes an arrangement of computer hardware and software components that may be used to implement aspects of the present disclosure. As illustrated, the computing device 300 includes a processing unit 304, a network interface 306, a computer readable medium drive 308, an input/output device interface 309, all of which may communicate with one another by way of a communication bus. The components of the computing device 300 may be physical hardware components or implemented in a virtualized environment.

The network interface 306 may provide connectivity to one or more networks or computing systems, such as the network 120 of FIG. 1. The processing unit 304 may thus receive information and instructions from other computing systems or services via a network. The processing unit 304 may also communicate to and from memory 310 and further provide output information for an optional display via the input/output device interface 409. In some embodiments, the computing device 300 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the computing device 300. The memory 310 may further include computer program instructions and other information for implementing aspects of the present disclosure. For example, in one embodiment, the memory 310 includes interface software 312 for receiving and processing content streams. Memory 310 includes a partition mapping component 316 for generating or obtaining mappings of subsets of the time series data received from data services 116 to one or more virtual keys associated with various partitions. The memory 310 further includes a range delete command processing component 318 for managing transaction range deletes utilizing the virtual keys mapped to the set of time series data.

As specified above, in one embodiment, the computing device 300 illustrated in FIG. 3 can be implemented as physical computing devices or virtualized computing devices in a computing network. In another embodiment, the computing device 300 may be implemented as logical components in a virtual computing network in which the functionality of the computing device 300 is implemented by an underlying substrate network of physical computing devices. Thus, aspects of the present application should not be limited to interpretation requiring a physical, virtual or logical embodiment unless specifically indicated as such.

Figure 4A:
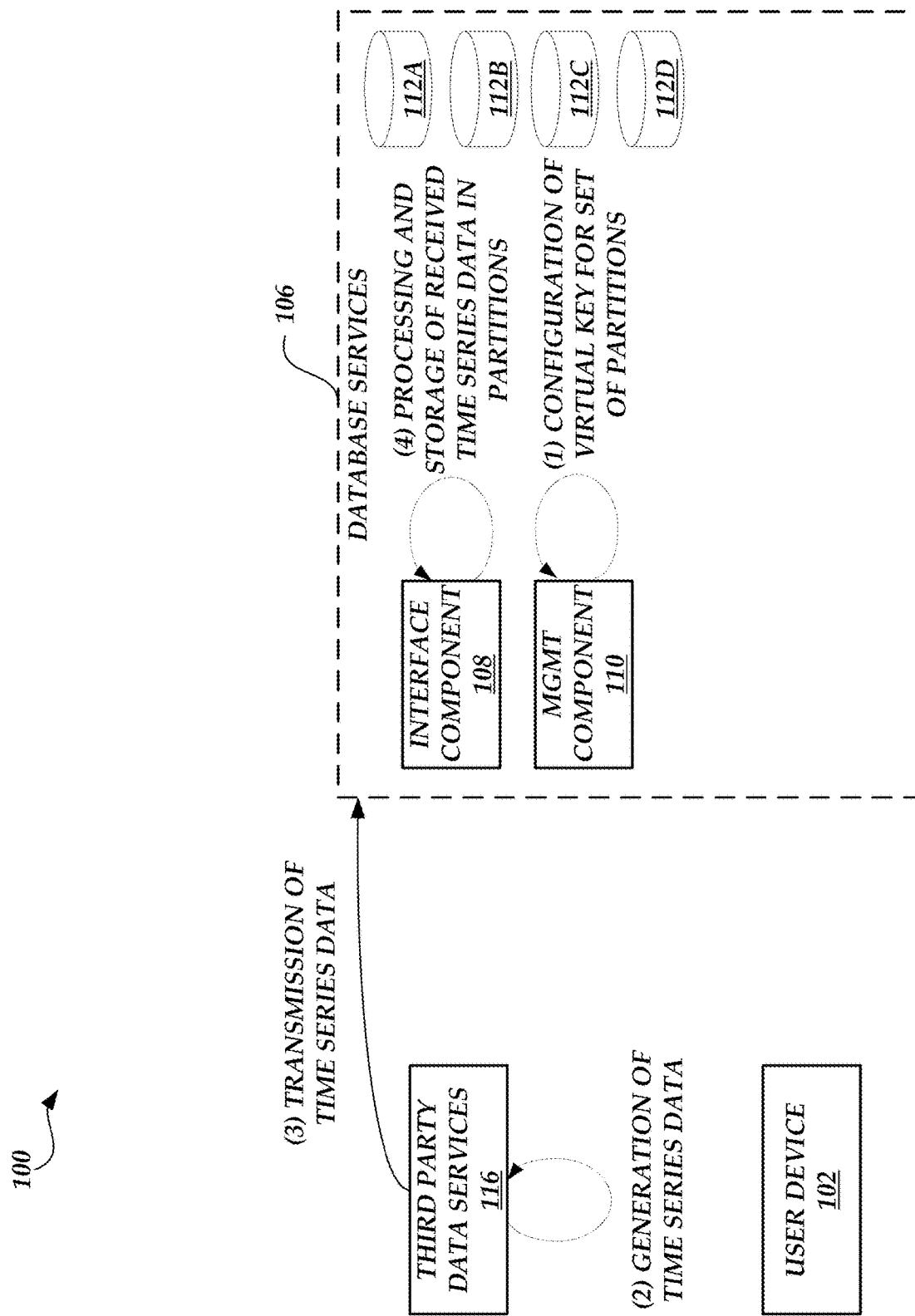
FIGS. 4A-4B are block diagrams of the network environment of FIG. 1 illustrating the generation and management of access attributes on generational data tables storing time series data in accordance with some embodiments.
Figure 4B:
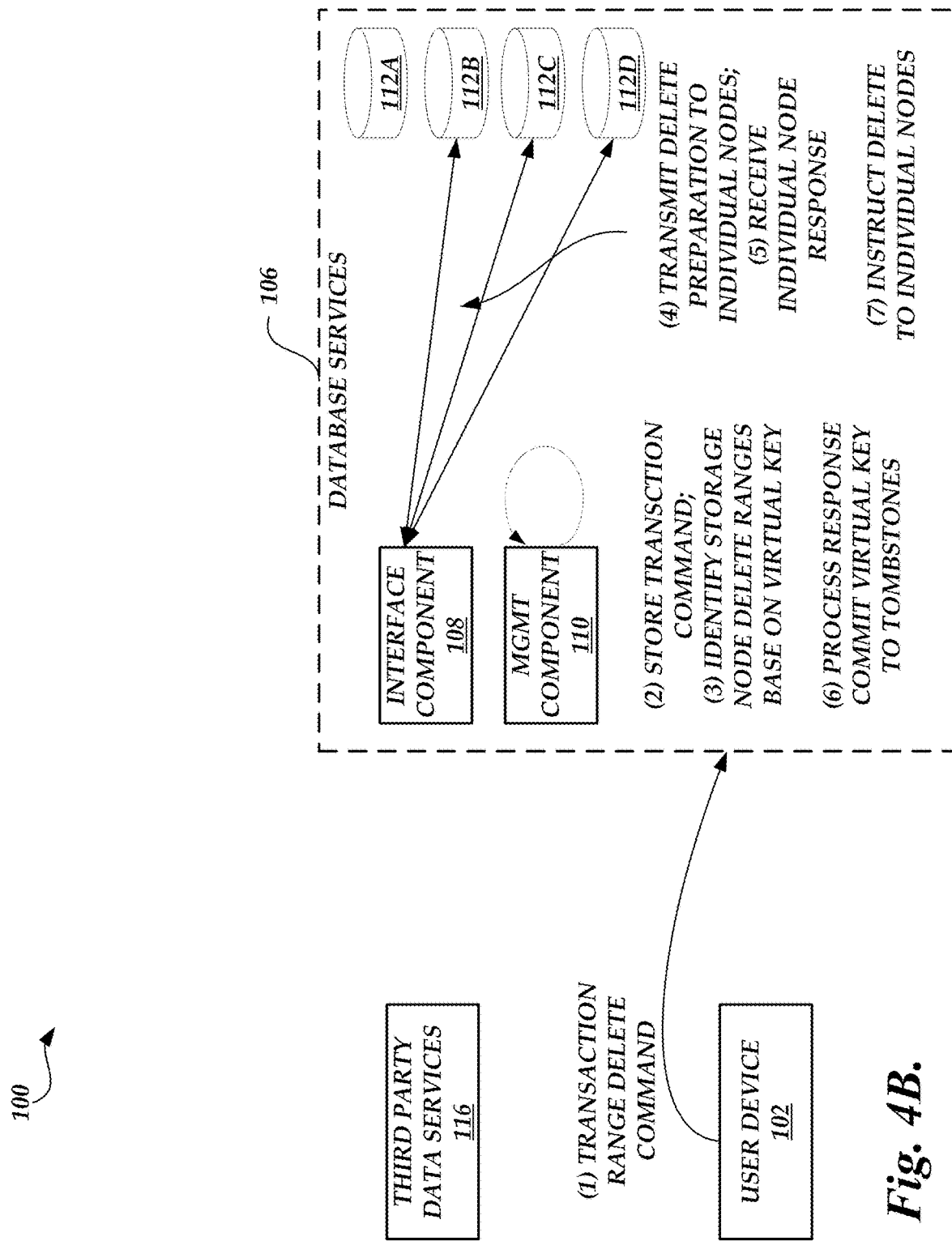

Turning now to FIGS. 4A and 4B, an illustrative interaction for the configuration of multiple partitions time series data storage and management of range delete commands associated with stored time series data will be described. For purposes of illustration, it is assumed that an illustrative third-party data service 116 has engaged to provide data, such as time series data, to the database service 106. As described above, in other embodiments, the third-party data service 106 can provide other data, such as data ordered based on range keys having a prefix that facilitates application of the illustrated interaction with this type of data. Illustratively, the database service 106 can receive a request or configuration from the user device 102 to process time series data (or other data). Such a request can establish at least a portion of the access control parameters or otherwise specify financial or performance metrics for the storage and retrieval of the time series data. For example, the request can include a specification of the size thresholds or timing information that be utilized to establish the number of partitions utilized to store the time series, performance criteria that may be utilized by the database service to determine the number of partitions, or other information relevant to how received time series data is received and stored at the database service.

At (1), the management component 110 of the database service 106 initially creates or causes to be created one or more partitions for receipt of time series data. The partitions are configured to receive subsets of the data. The number and distribution of the partitions can be based on criteria, such as redundancy, performance, user specified parameters and the like. As described above, the database service 106 associates each individual partition with a virtual key that maps/captures the portion of the range of time series data (e.g., the subset of time series data) maintained in the individual partition. The virtual key illustratively is defined as a beginning range of the time series data (inclusive) and an ending range of the time series data (exclusive). In one embodiment, the range of time series data (or other data) in individual virtual keys is continuous or successive across multiple partitions (e.g., continuous ranges of timing information). In other embodiments, the range of time series data (or other data) in individual keys and partitions not necessarily continuous. For example, each virtual key and partition may be assigned to a range of device identifiers that are not continuous but can be uniquely identified to facilitate partition scanning. The set of virtual keys corresponding to all the partitions should illustratively encompass the entire set of time series data. Additionally, the management component 110 can store the set of virtual keys according to a B-tree or hash tree structure. In the event of disruption of the processing of delete range commands or general disruption of service, the management component 110 can utilize the stored set of virtual keys to restore the processing of the received transactional range delete command.

With reference to an illustrative example, assume the four data nodes illustrated in FIG. 4A (112A, 112B, 112C and 112D) each maintain a single partition. For a given client (identifier=xxxx), a set of time series data includes 4000 data values. Additionally, assume each partition is configured to be able to maintain 1000 data values in sequential order (based on timing information). Accordingly, the virtual keys for the four partitions may have the following properties:

- 112A=Partition Key=xxxx; SortKey start (inclusive): (open); end (exclusive): 1000
- 112B=Partition Key=xxxx; SortKey start (inclusive): 1000; end (exclusive): 2000
- 112C=Partition Key=xxxx; SortKey start (inclusive): 2000; end (exclusive): 3000
- 112D=Partition Key=xxxx; SortKey start (inclusive): 3000; end (exclusive): (open)

With continued reference to FIG. 4A, at (2), a data service 116 generates time series data and transmits at least subsets of the time series data associated with a range of values, such as by timing information, to a database services 106 at (3). At (4), after receipt, the database service 106 stores the receiving set of time series data by writing subsets of the time series data a plurality of partitions, 112A-112D. The plurality of partitions may be located on one or more database nodes. Although not illustrated in FIG. 4A, the allocation of partitions and storage of the data can be dynamic in nature, such that additional partitions may be added to further distribute the storage of data (e.g., splitting a previous allocation) or additional partitions may be removed or reconfigured (e.g., merging previous allocations).

With reference now to FIG. 4B, at some point after the time series data has been collected and stored by the database service 106, the database service can receive and process one or more commands to manipulate at least a portion of the time series data, namely, a transactional range delete command. As described above, transactional range delete commands specify a range of data to delete, such as by specifying a lower identifier bound and a higher identifier bound. As illustrated in FIG. 4B, at (1), the user device 102 can transmit a transactional range delete command to the database service. For purposes of an illustrative example, assume that the transactional range delete command specifies a range that encompasses multiple partitions with the following general form:

DeleteCommand (Partition Key=xxxx; SortKey (inclusive): 1500; end (exclusive) 3500)

To facilitate the processing of commands, such as a transactional range delete, the database service 106 receives the commands and processes the command to identify the partitions that maintain time series data relevant to the command. In some embodiments, the database service 106 may receive multiple transactional range delete commands. If the multiple transactional range delete commands to not have an overlapping range, the database service 106 can process the multiple commands in parallel or successively. If the multiple transactional range delete commands have at least some overlapping ranges, the database service 106 may reject or hold all subsequently received transactional range delete commands. In another embodiment, the database service 106 can combine the transactional range delete commands (e.g., a superset of ranges) or modify the subsequently received transactional range delete commands to remove the overlapping ranges that will be deleted when the previously received transactional range delete commands are completed.

At (2), the database service 106 can first store the received command to ensure against a failure or error of the management component 110 or the preservation of state/status throughout the processing of the transaction range delete command. As described above, the set of virtual keys may be maintained in a B-tree or hash tree structure to facilitate recovery of the virtual keys if needed. At (3), the database service 106 can utilize the set of virtual keys associated with each of the partitions to identify which partition includes times series data falling within the specified range of time series data included in the transaction range delete command. If the transactional range delete command only corresponds to time series data maintained in a single partition, the database service can simply execute the command (e.g., deleting the specified full range of time series data) on the single partition.

If the transaction range delete command encompasses multiple partitions, the database service specifies for each virtual key the range of time series that should be deleted in each partition. Because the transaction range delete command traverses multiple partitions, it is possible that time series data from some partitions can be deleted and that only portions of time series data from some partitions can be deleted. With continued reference to the previous example having a continuous range of time series data, the transaction range delete command does not overlap with some with one the partitions, partially overlaps with two partitions and fully overlaps with one partition as follows:

112A=Partition Key=xxxx; SortKey start (inclusive): (open); end (exclusive): 1000—No Overlap

112B=Partition Key=xxxx; SortKey start (inclusive): 1000; end (exclusive): 2000-Partial Overlap—1500-2000

112C=Partition Key=xxxx; SortKey start (inclusive): 2000; end (exclusive): 3000—Full Overlap

112D=Partition Key=xxxx; SortKey start (inclusive): 0; end (exclusive): (open)—Partial Overlap—3000-3500.

Once the relevant partitions have been identified, at (4), the management component 110 then prepares the identified set of partitions by transmitting a prepare for deletion communication to the set of applicable nodes. As illustrated in FIG. 4B, node 112A does not receive any communication because the range of stored time series data does not overlap with the range specified in the transactional range delete command. However, because nodes 112B, 112C and 112D each include partially overlapping ranges, the management component 110 transmits communication to each of these nodes. Illustratively, each of the nodes processes the prepared requests transmitted by the database service. If the time series data does not exist or if the node is unable to delete time series data, the request can be ignored or returned with an error notification. Alternatively, at (5), each receiving node 112B, 112C and 112D transmits a confirmation to the management component 110.

At (6), the management component 110 processes the response and if confirmed, the virtual keys are converted to an indicator, generally referred to as range tombstones, which specify that the time series data in each of the partitions can overwritten or no longer operable for subsequent read commands. As described above, in other embodiments, the database service 106 can begin overwriting time series data (or other data) subsequent to the transactional delete command that may accessed post completion of the received transactional delete command. At (7), the management component transmits instructions to the nodes to commit the deletion. Additionally, in some embodiments, the database service can continue to split and merge partitions during the processing of transaction range delete commands. If so, the management component 110 will adjust the virtual key/tombstone processing based on the split/merger. Accordingly, by utilizing aspects of the present application, data services can benefit from the distributed, multi-partitions redundancy and performance optimizations and be able to support specific commands, such as transactional range deletes, that are not traditionally available in distributed, multi-partition storage frameworks.

Figure 5:
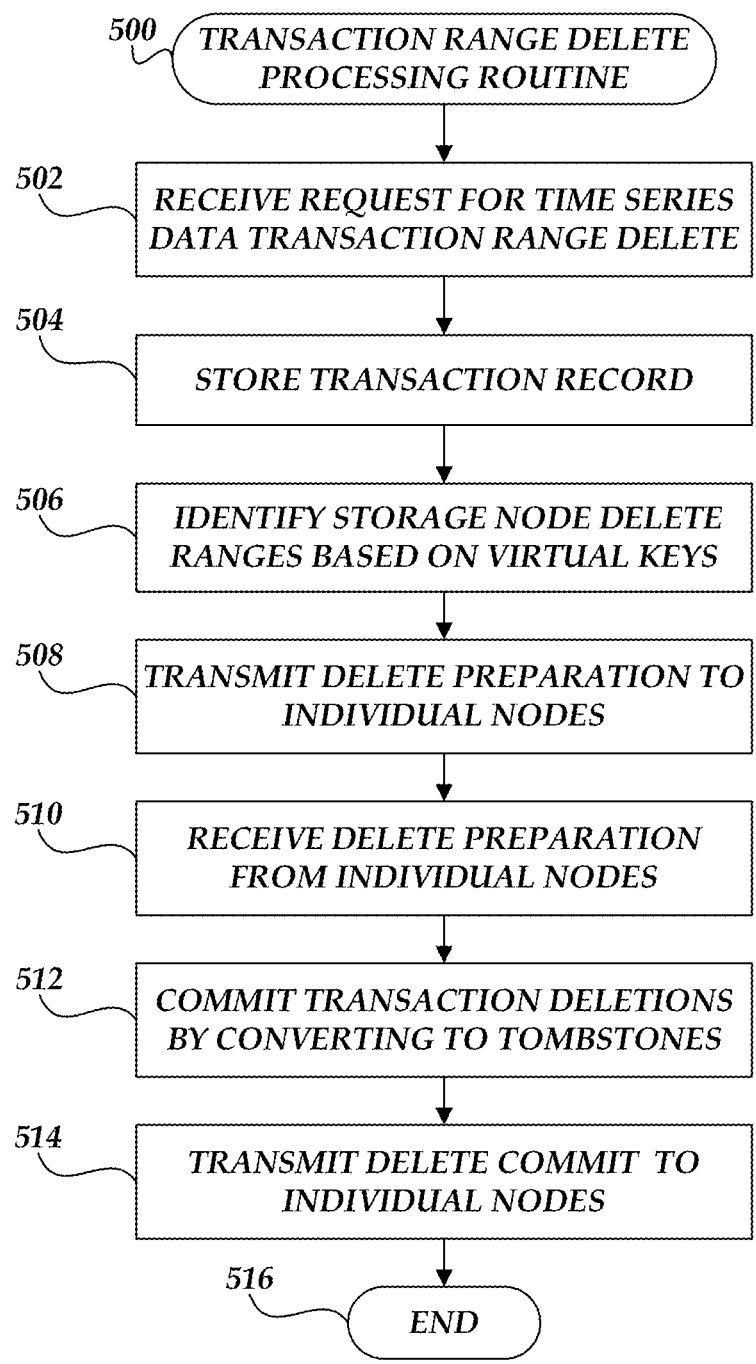
FIG. 5 is a flow diagram illustrative of a transaction range delete processing routine implemented by a database service in accordance with some embodiments.

With reference to FIG. 5, a flow diagram 500 illustrative of a transaction range delete command management routine 500 implemented by the database service 106 will be described. Illustratively, routine 500 can be implemented upon configuration of the database service 106 to receive time series data from a third-party data service 116 and receipt of a transactional range delete command from a user device 102. As previously described, it is assumed that an illustrative third-party data service 116 has engaged to provide data, such as time series data, to the database service 106. Illustratively, the database service 106 can receive a request or configuration from the user device 102 to process time series data (or other data). Such a request can establish at least a portion of the access control parameters or otherwise specify financial or performance metrics for the storage and retrieval of the time series data. For example, the request can include a specification of the size thresholds or timing information that be utilized to establish the number of partitions utilized to store the time series, performance criteria that may be utilized by the database service to determine the number of partitions, or other information relevant to how received time series data is received and stored at the database service. While routine 500 will be described with regard to processing time series data, one skilled in the relevant art will appreciate that routine 500 may be implemented with other data having range keys no corresponding to timing information or data not otherwise considering time series data.

Additionally, it is assumed for routine 500 the management component 110 of the database service 106 initially creates or causes to be created one or more partitions for receipt of time series data. The partitions are configured to receive subsets of the data. The number and distribution of the partitions can be based on criteria, such as redundancy, performance, user specified parameters and the like. As described above, the database service 106 associates each individual partition with a virtual key that maps/captures the portion of the range of data (e.g., a subset of time series data) maintained in the individual partition. The virtual key illustratively is defined as a beginning range of the data (inclusive) and an ending range of the data (exclusive). The set of virtual keys corresponding to all the partitions should illustratively encompass the entire set of time series data. In some embodiments, the range of time series data (or other data) may be continuously ordered between the different partitions. In another embodiments, individual partitions will have a defined range of time series data (or other data) but the ranges between partitions and virtual keys will not be continuous. As described above, the set of virtual keys may be stored in a B-tree or hash tree to facilitate access to the virtual keys, especially in situations in which the processing of the transactional delete command has been disrupted or experiences a general failure.

Accordingly, routine 500 begins at block 502, in which the database service receives a transactional range delete command from a user device 102. In one example, the transactional range delete may only encompass a single partition. In another example, the transactional range delete command specifies a range that encompasses multiple partitions.

To facilitate the processing of commands, such as a transactional range delete, the database service 106 receives the commands and processes the command to identify the partitions that maintain time series data relevant to the command. As described above, in some embodiments, the database service 106 may receive multiple transactional range delete commands. If the multiple transactional range delete commands to not have an overlapping range, the database service 106 can process the multiple commands in parallel or successively. If the multiple transactional range delete commands have at least some overlapping ranges, the database service 106 may reject or hold all subsequently received transactional range delete commands. In another embodiment, the database service 106 can combine the transactional range delete commands (e.g., a superset of ranges) or modify the subsequently received transactional range delete commands to remove the overlapping ranges that will be deleted when the previously received transactional range delete commands are completed.

At block 504, the database service 106 can first store the received command to ensure against a failure or error of the management component 110 or the preservation of state/status throughout the processing of the transaction range delete command. At block 506, the database service 106 can utilize the set of virtual keys associated with each of the partitions to identify which partition includes times series data falling within the specified range of time series data included in the transaction range delete command. If the transactional range delete command only corresponds to time series data maintained in a single partition, the database service can simply execute the command (e.g., deleting the specified full range of time series data) on the single partition.

If the transaction range delete command encompasses multiple partitions, the database service specifies for each virtual key the range of time series that should be deleted in each partition. Because the transaction range delete command traverses multiple partitions, it is possible that time series data from some partitions can be deleted and that only portions of time series data from some partitions can be deleted.

Once the relevant partitions have been identified, at block 508, the management component 110 then prepares the identified set of partitions by transmitting a prepare for deletion communication to the set of applicable nodes. At block 510, each receiving node 112B, 112C and 112D transmits a confirmation to the management component 110. As described above, each of the nodes processes the prepared requests transmitted by the database service. If the time series data does not exist or if the node is unable to delete time series data, the request can be ignored or returned with an error notification.

At block 512, the management component 110 processes the response and if confirmed, the virtual keys are converted to an indicator, generally referred to as range tombstones, which specify that the time series data in each of the partitions can be overwritten or no longer operable for subsequent read commands. If the database service 106 subsequently begins writing time series data associated with a date after the receipt of the transactional range delete command, the database service 106 may make this data accessible. At block 514, the management component 110 transmits instructions to the nodes to commit the deletion. Additionally, in some embodiments, the database service can continue to split and merge partitions during the processing of transaction range delete commands. If so, the management component 110 will adjust the virtual key/tombstone processing based on the split/merger. Accordingly, by utilizing aspects of the present application, data services can benefit from the distributed, multi-partitions redundancy and performance optimizations and be able to support specific commands, such as transactional range deletes, that are not traditionally available in distributed, multi-partition storage frameworks. Routine 500 terminates at block 516.

Figure 6:
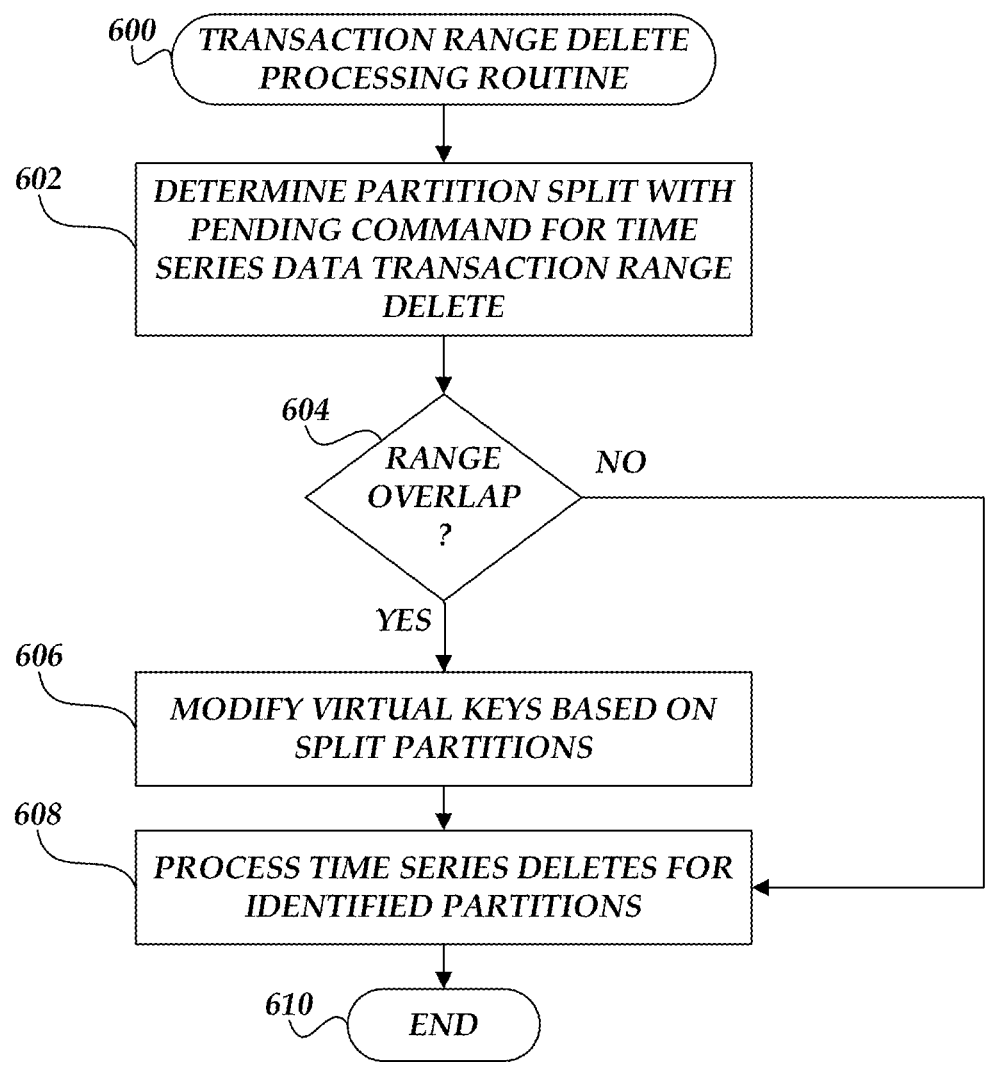
FIG. 6 is a flow diagram illustrative of a transaction range delete processing routine implemented by a database service in accordance with some embodiments.

Turning now to FIG. 6, a flow diagram 600 illustrative of a transaction range delete command management routine 600 implemented by the database service 106 will be described. Illustratively, routine 600 can be implemented upon configuration of the database service 106 to receive time series data from a third-party data service 116 and upon determination that one or more of the previously configured partitions will be split. At block 602, the management component 110 determines that a partition split will occur with a pending command for a transactional range delete. Illustratively, partition splits can occur as part of management of the time series data to add increased redundancy or performance. Such commands may be initiated by criteria maintained by the database service 106 or via a command/configuration generated by a system administrator. While routine 600 will be described with regard to processing time series data, one skilled in the relevant art will appreciate that routine 600 may also be implemented with other data having range keys no corresponding to timing information or data not otherwise considering time series data.

At decision block 604, a test is conducted to determine whether the split corresponds to a range overlap with a partition that has been identified as including time series data to be deleted. Illustratively, if the range does overlap, the previously delete command will now encompass the two partitions that will result from the split. Accordingly, at block 606, the management component 110 modifies the virtual key of the partition to be split to form two virtual keys corresponding to the post-split state of the partitions. This results in one additional partition that will be part of the implementation of the transactional range delete processing routine 500 illustrated in FIG. 5. If no overlap exists, the split will not affect the deletion command and or once the virtual keys have been modified, the routine 600 proceeds to block 608 where the management component processes the time series deletes for either the previously identified virtual keys or newly identified virtual keys. At block 610, the routine 600 terminates.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system to manage time series data comprising:
one or more computing devices associated with a management component of a database service, wherein the management component is configured to:
create a set of virtual keys for a set of time series data, wherein the time series data is associated with timing information defining a lower bound of timing information for the set of time series data and an upper bound of timing information for the set of time series data, wherein each of the virtual keys in the set of virtual keys corresponds to individual partitions that maintain a subset of the time series data, and wherein individual virtual keys define a lower bound of timing information for the subset of time series data and an upper bound of timing information for the subset of time series data;
receive a transactional range delete command specifying a deletion range identifying a lower bound of timing information for the time series data to be deleted and an upper bound of timing information for the time series data to be deleted;
identify, from the set of virtual keys, a plurality of partitions including time series data overlapping with at least a portion of the deletion range;
transmit to the identified plurality of partitions a request to prepare for deletion of at least a portion of the subset of time series data overlapping with at least a portion of the deletion range;
receive confirmation from the identified plurality of partitions; and
responsive to the received confirmation, transmit deletion instructions to the identified plurality of partitions.

2. The system of claim 1, wherein identifying the plurality of partitions includes at least one partition having complete time series data overlapping with a portion of the deletion range.

3. The system of claim 1, wherein identifying the plurality of partitions includes at least one partition having partial time series data overlapping with a portion of the deletion range.

4. The system of claim 1, wherein responsive to the received confirmation, the management component is further operable to convert the virtual keys to tombstones information indicating that further data operations should not be processed.

5. The system of claim 1, wherein the management component is further operable to process at least one of a merge command or split command modifying the partitions prior to transmitting the deletion instructions.

6. A computer-implemented method to manage processing of data in a database service, wherein the data is associated with range keys defining a lower bound of range keys for the set of data and an upper bound of range keys for the set of data, the method comprising:
receiving a transactional range delete command specifying a deletion range identifying a lower bound of range keys for data to be deleted and an upper bound of the range keys for the data to be deleted;
identifying, from a set of virtual keys associated for the data, a plurality of partitions including data overlapping with at least a portion of the deletion range, wherein each of the virtual keys in the set of virtual keys corresponds to individual partitions maintaining a subset of the data, and wherein individual virtual keys define a lower bound of range keys for the subset of data and an upper bound of range keys for the subset of data;
transmitting to the identified plurality of partitions, instructions to delete at least a portion of the subset of data maintained by the identified plurality of partitions, wherein the portion of the subset of data overlaps with the portion of the deletion range.

7. The computer-implemented method of claim 6 further comprising creating the set of virtual keys for the set of data.

8. The computer-implemented method of claim 6 further comprising:
transmitting to the identified plurality of partitions a request to prepare for deletion of at least a portion of the subset of data overlapping with at least a portion of the deletion range; and
receiving confirmation from the identified plurality of partitions.

9. The computer-implemented method of claim 6, wherein identifying the plurality of partitions includes identifying at least one partition completely overlapping with a portion of the deletion range.

10. The computer-implemented method of claim 6, wherein identifying the plurality of partitions includes identifying at least one partition partially overlapping with a portion of the deletion range.

11. The computer-implemented method of claim 6, wherein identifying the plurality of partitions includes identifying at least one partition having no data overlapping with a portion of the deletion range.

12. The computer-implemented method of claim 6 further comprising converting a subset of the set of virtual keys to tombstones information indicating that further data operations should not be processed.

13. The computer-implemented method of claim 12 further comprising denying subsequent read commands responsive to the tombstone information.

14. The computer-implemented method of claim 6 further comprising:
obtaining a split command corresponding to one or more of the plurality of partitions; and
modifying the set of virtual keys based on a determination of overlap with the deletion range and a split point in one or more partitions.

15. The computer-implemented method of claim 14 further comprising modifying the set of virtual keys corresponding to the split command.

16. A computer-implemented method to manage data received at a database service, the method comprising:
receiving a transactional range delete command to delete a portion of the data received at the database service, wherein the data is associated with timing information, and further wherein the transactional range delete command specifies a deletion range identifying a lower bound of timing information for the data to be deleted and an upper bound of timing information for the data to be deleted;

responsive to receiving the transactional range delete command, identifying, from a set of virtual keys associated with the data, a plurality of partitions including data overlapping with at least a portion of the deletion range, wherein each of the virtual keys in the set of virtual keys corresponds to individual partitions maintaining a subset of the data, and further wherein each of the virtual keys define a lower bound of timing information for the subset of data and an upper bound of timing information for the subset of data; and transmitting to the identified plurality of partitions, instructions to delete at least a portion of the subset of data maintained by the identified plurality of partitions, wherein the portion of the subset of data overlaps with the portion of the deletion range.

17. The computer-implemented method of claim 16, wherein the timing information associated with the data defines a lower bound for the data and an upper bound for the data.

18. The computer-implemented method of claim 16 further comprising creating the set of virtual keys for the data.

19. The computer-implemented method of claim 16 further comprising:
   obtaining a split command corresponding to one or more of the plurality of partitions; and
   modifying the set of virtual keys based on a determination of overlap with the deletion range and a split point in one or more partitions.

20. The computer-implemented method of claim 19 further comprising modifying the set of virtual keys corresponding to the split command.

21. The computer-implemented method of claim 16 further comprising converting a subset of the set of virtual keys to tombstones information indicating that further data operations should not be processed.

22. The computer-implemented method of claim 16 wherein each partition in the plurality of partitions is maintained on a separate database node.

23. The computer-implemented method of claim 16, wherein at least two partitions in the plurality of partitions are maintained on a database node.

\* \* \* \* \*